United States Patent [19]

Jones

[11] 4,064,796
[45] Dec. 27, 1977

[54] COOKING APPARATUS

[76] Inventor: John R. Jones, 4793 Coventry Mall, Memphis, Tenn. 38118

[21] Appl. No.: 710,917

[22] Filed: Aug. 2, 1976

[51] Int. Cl.² .............................................. A47J 37/00
[52] U.S. Cl. ........................................ 99/330; 99/332; 99/346; 99/426; 99/447; 99/448; 426/439
[58] Field of Search ................. 99/346, 341, 447, 448, 99/339, 340, 330, 332, 352, 426, 516, 534, 535, 536, 402, 355; 426/509, 510, 511, 523, 438, 439

[56] References Cited

U.S. PATENT DOCUMENTS

| | | | |
|---|---|---|---|
| 1,685,884 | 10/1928 | Sindall | 99/352 |
| 1,732,010 | 10/1929 | Goodell | 99/346 |
| 2,011,247 | 8/1935 | Jourdan | 99/346 |
| 2,060,992 | 11/1936 | Jackson | 99/352 |
| 2,374,425 | 4/1945 | De Weerth | 99/355 |
| 3,040,650 | 6/1962 | Watts | 99/402 |
| 3,295,434 | 1/1967 | Wilhelm | 99/346 |
| 3,966,983 | 6/1976 | Dexter | 426/439 |

FOREIGN PATENT DOCUMENTS 308,742   9/1971   U.S.S.R. ................................. 99/404

*Primary Examiner*—Billy J. Wilhite
*Attorney, Agent, or Firm*—John R. Walker III

[57] ABSTRACT

Apparatus for cooking various food items. The apparatus includes an enclosed cooking compartment disposed a spaced distance above a reservoir which contains a quantity of cooking oil. A rack is provided for suspending the items of food at spaced apart distances one from the other within the cooking compartment. The oil is heated and forced through nozzles which are uniformly spaced about the interior of the cooking compartment thus forming a mist from the hot cooking oil which saturates the interior space of the cooking commpartment. Thus, the suspended items of food become suffused with the mist of hot oil which effectively accomplishes the cooking process of the food.

8 Claims, 9 Drawing Figures

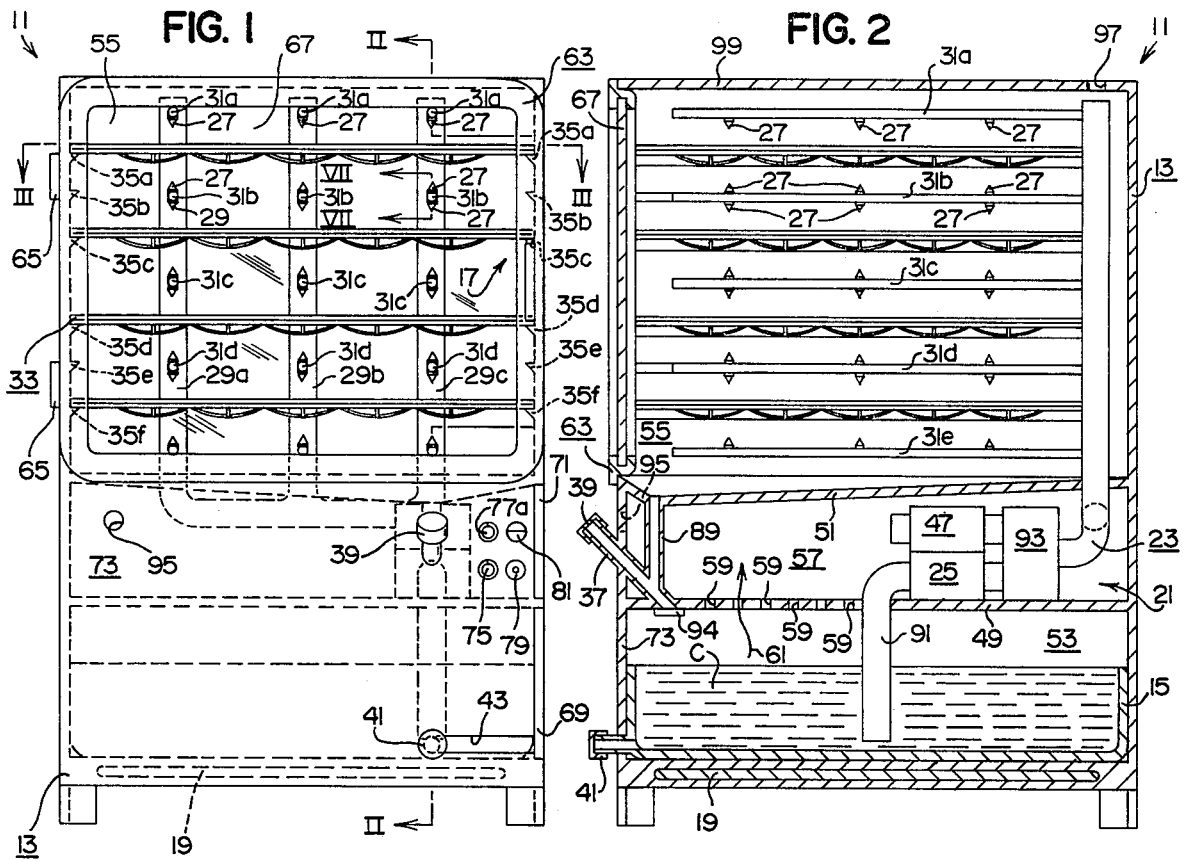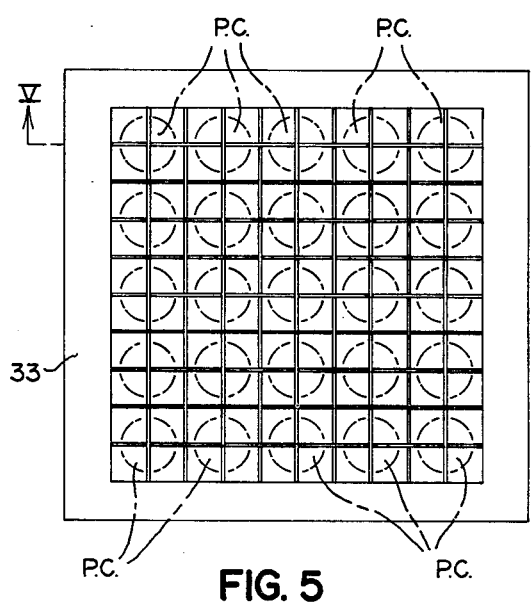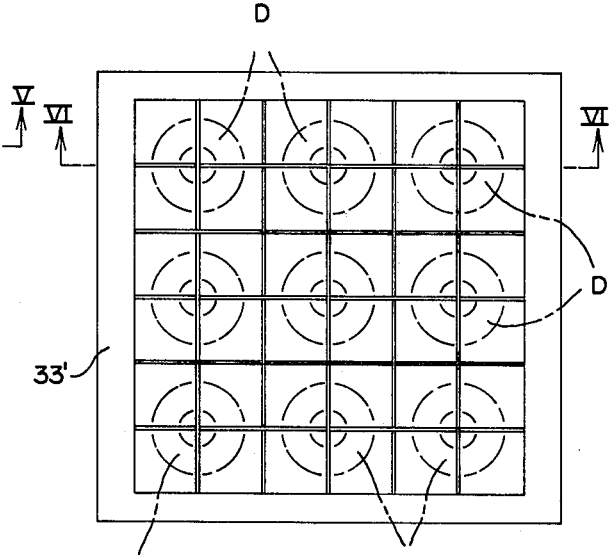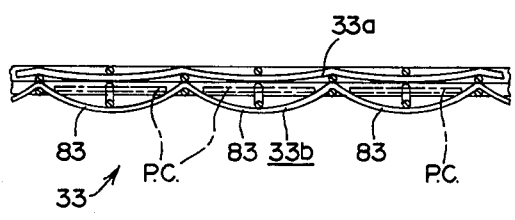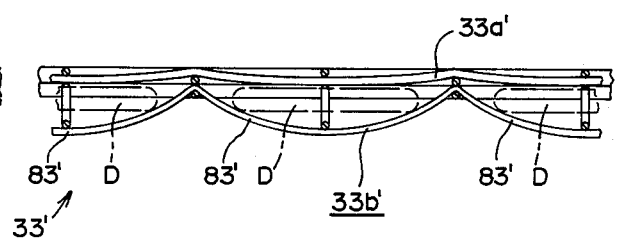

COOKING APPARATUS

BACKGROUND OF THE INVENTION

1. Field of the Invention

This invention relates to the field of cooking devices respectively having reservoirs of cooking oil used for accomplishing the cooking process in one fashion or another and is particularly directed toward such devices which do not depend upon the items of food being submerged in the cooking oil during the cooking process.

2. Description of the Prior Art

Cooking apparatus utilizing a reservoir of heated cooking oil is well known; however, the prior devices, by and large, depend on the items of food being submerged in the fat or hot cooking oil. Obviously, particles of the submerged food become separated from the piece as a whole which causes numerous problems. One of these problems is the particles become overcooked or are burned to a crisp which adversely affects the flavor of food subsequently cooked in the hot grease. Numerous patents have been granted for various attempts at solving this particular problem, e.g., attempts have been made to filter the fat while other attempts have been made to cause the reservoir to continuously overflow as as to sweep from the fat those loose particles. However, none of the attempts known by the applicant is totally effective in preventing the old or used cooking oil from adversely affecting items of food subsequently cooked therein. Accordingly, the most effective approach at solving this problem is to frequently change the cooking oil or simply to discard the cooking oil after very little use. Obviously, this can be a rather costly approach in view of the ever-increasing cost of cooking oil and the like.

Due to the above-mentioned problem, among others, the typical housewife doesn't attempt to cook doughnuts or potato chips and the like which are usually submerged in deep fat during the cooking process. Therefore, these items of food are usually purchased from a grocery outlet with little or no assurance of their freshness which is a very important feature of these food items, i.e., stale doughnuts and soggy potato chips would rank high on a list comprising the most undesirable or unappetizing items of food.

SUMMARY OF THE INVENTION

The present invention is directed toward overcoming the problems and disadvantages of prior cooking devices, particularly the problem associated with submerging the items of food in the hot cooking oil, i.e., the taste of the items of food being adversely affected by the charred particles of food in the hot cooking oil. Additionally, the concept of the present invention is to provide cooking apparatus which is geared toward economical fabrication, thus, hopefully becoming one of the common electrical applicances found in a typical home.

Further, the concept of the present invention is particularly directed towards providing a small electrical appliance that will offer an incentive for the housewife to prepare and cook doughnuts and potato chips and the like, thus assuring the freshness and wholesome taste highly desirable in these particular items of food.

The apparatus of the present invention includes an enclosed cooking compartment disposed a spaced distance above a reservoir which contains a quantity of cooking oil. A rack is provided for suspending the items of food at spaced apart distances one from the other within the cooking compartment. The oil is heated and forced through nozzles which are uniformly spaced about the interior of the cooking compartment thus forming a mist from the hot cooking oil which saturates the interior space of the cooking compartment. Thus, the suspended items of food become suffused with the mist of hot oil which effectively accomplishes the cooking process of the food. Therefore, since the items of food are not submerged in the cooking oil the usual problems associated with deep fat fryers are obviated. More specifically, the particles of food which become separated from the whole piece remain in the cooking compartment which may readily and thoroughly be cleaned subsequent to the cooking process, thus the cooking oil remains fresh and wholesome for subsequent re-use, i.e., no longer is the cooking oil adversely affected by the burned particles of the food.

Further, the cooking apparatus of the present invention may alternately be used to glaze doughnuts or to spray a chocolate covering on the doughnuts. More specifically, the cooking oil contained in the reservoir can simply be replaced with the glazing solution or the chocolate which is forced through the system in like manner as the cooking oil.

Also, the apparatus of the present invention is self-cleaning since the reservoir can be filled with washing solution which is circulated through the system in the same manner as the cooking oil, the glazing solution, and/or the chocolate substance.

DESCRIPTION OF THE DRAWINGS

FIG. 1 is a front elevational view of the cooking apparatus of the present invention viewing the cooking compartment through a glass panel door opening therein.

FIG. 2 is a sectional view taken as on the line II—II of FIG. 1.

FIG. 3 is a sectional view taken as on the line III—III of FIG. 1 showing a portion of one embodiment of rack structure for suspending the items of food within the cooking compartment.

FIG. 4 is a view similar to FIG. 3 showing an alternate embodiment of the rack structure of the present invention.

FIG. 5 is an enlarged partial view taken as on the line V—V of FIG. 3 which more clearly depicts the rack structure for supporting the items of food.

FIG. 6 is an enlarged partial view taken as on the line VI—VI of FIG. 4 which more clearly depicts the alternative embodiment of the rack structure.

DESCRIPTION OF THE PREFERRED EMBODIMENT

Figure 7:
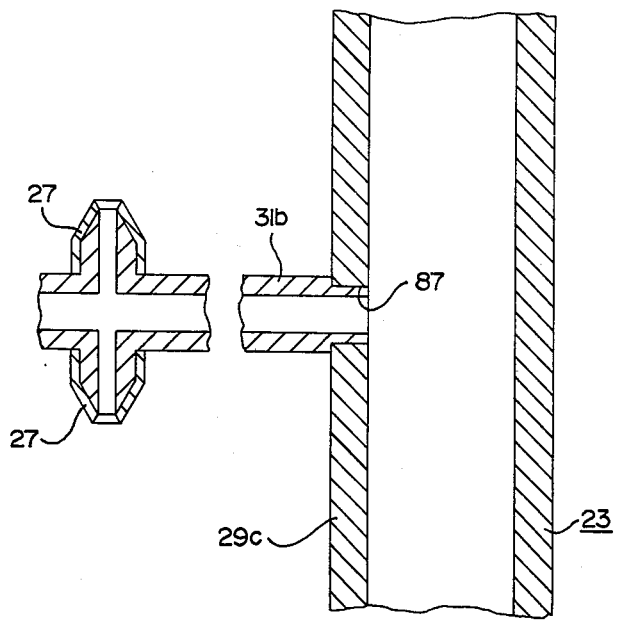
FIG. 7 is an enlarged partial view taken as on the line VII—VII of FIG. 1 clearly depicting the conduit and nozzle means of the present invention.

The apparatus 11 of the present invention is intended for cooking various food items, e.g., potato chips characterized by the letters PC or doughnuts characterized by the letter D and the like, in a new and unusual manner to be fully disclosed herein. The cooking apparatus 11 includes a housing 13 preferably formed from sheet metal or the like and in a manner known to those skilled in the art. Also included is a reservoir 15 for containing a quantity of cooking oil characterized by the letter C, e.g., corn oil or the like. Also included therewith is rack means 17 for suspending the items of food within the housing 13 at a spaced distance one from the other. It should be understood that the general term housing 13 may, if desirable, be a separate component from the reservoir 15. Additionally, the housing 13 should generally be regarded as that structure into which the terms of food may be placed during the cooking process, i.e., the housing contains the rack means 17. The cooking apparatus 11 also includes means for heating the cooking oil, e.g., a typical electrical heating element 19 or the like. Also included therewith are vaporescence means 21 (FIG. 9) communicated with the reservoir 15 for forming a mist of the hot cooking oil C with the housing 13 with the suspended items of food being suffused by the mist of hot oil whereby the cooking process of the food is accomplished. If desired, garlic flavoring, bar-b-que flavoring, etc., may be put in the cooking oil.

The vaporescence means 21 includes a maze of conduit means, as at 23, for communicating the reservoir 15 with the housing 13. The vaporescence means 21 also includes pump means 25, e.g., electrically driven fluid pump structure, coupled to the conduit means 23 for delivering under pressure the hot cooking oil C into the housing 13. Also included therewith is a plurality of spray nozzle means 27 uniformly disposed within the housing 13 and suitably coupled to the conduit means 23 for vaporizing the hot cooking oil C thus continuously forming a mist therefrom which saturates the interior of the housing 13 as the pump means 25 is being operated.

The conduit means 23 includes a plurality of vertical members 29 which are individually designated at 29a, 29b, 29c, etc. Each of the vertical conduit members 29 has threadedly attached thereto a plurality of horizontally disposed conduit members 31 which are individually designated as 31a, 31b, 31c, etc. From FIGS. 2 and 7 of the drawings it may clearly be seen that the horizontal conduit members 31 have the spray nozzle means 27 attached thereto. More specifically, the uppermost horizontal conduit member 31a (FIG. 2) has only downwardly directed spray nozzle means 27, the lowermost horizontal conduit member 31e has only upwardly directed spray nozzle means 27, while the intermediate horizontal conduit members 31b, 31c, and 31d have both upwardly and downwardly directed spray nozzle means attached thereto. In the interest of brevity, only three vertical conduit members 29 are shown while in actual practice it may be desirable to increase the number of vertical conduit members 29. In this same regard, only three intermediate horizontal conduit members, i.e., 31b, 31c, and 31d, are shown while the actual practice it is anticipated that considerably more horizontal conduit members 31 are included so as to increase the number of rack means 17, thus the quantity of food being cooked during any one cycle of the cooking apparatus 11 is greatly increased.

The rack means 17 includes a plurality of wire mesh-like trays 33 for holding the food items PC or D. Additionally, the housing 13 includes a plurality of tray support means or ledges 35 which are individually designated at 35a, 35b, 35c, etc., for supporting the trays 33 with the trays 33 being removable from the housing 13.

The plurality of wire mesh-like trays 33 are arranged in pairs with each pair including a lower mesh-like tray 33a and an upper mesh-like tray 33b having the items of food, e.g., potato chips PC, sandwiched therebetween as clearly shown in FIG. 5 of the drawings.

The cooking apparatus 11 also includes a cooking oil filler neck 37 to enable the reservoir 15 to be filled with cooking oil and a cap 39 for conveniently closing the filler neck 37. Also, the appartus 11 includes a drain cap 41 for enabling the cooking oil C to be conveniently drained from the reservoir 15.

The reservoir 15 preferably is removable from the housing 13, therefore, the housing 13 is provided with a slot 43 which conveniently allows the ffiller neck 37 to pass freely therethrough during the process of removing and replacing the reservoir 15.

Figure 9:
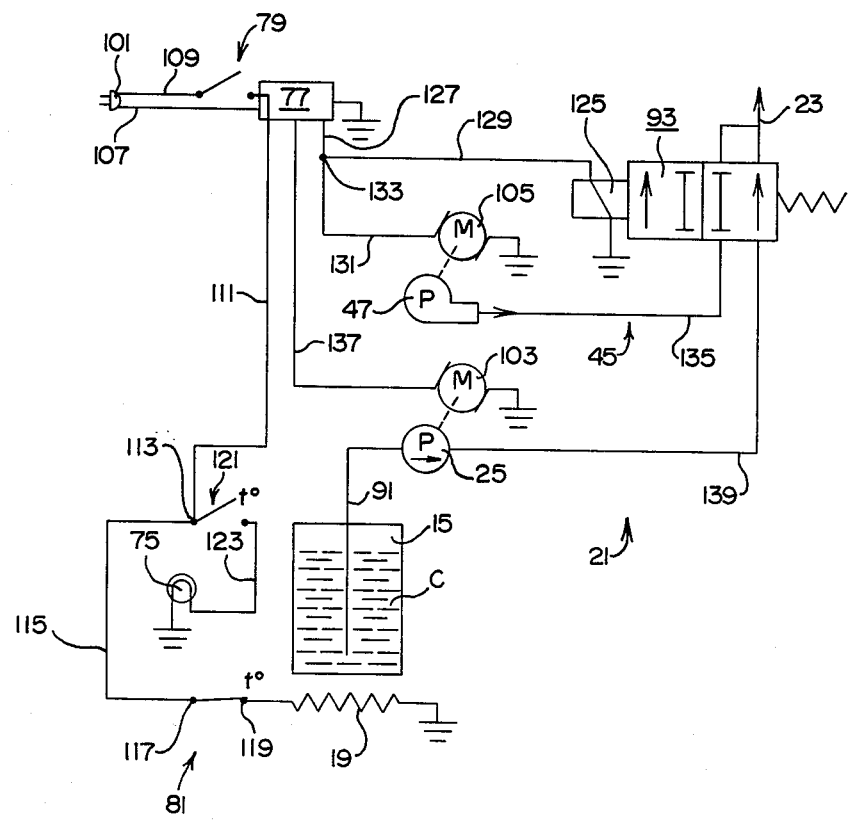
FIG. 9 is a schematic which diagrammatically depicts the operating structure of the cooking apparatus of the present invention.

The cooking apparatus 11 includes forced air circulation means 45, as shown in FIG. 9, i.e., including an electrically driven air pump 47 or the like. From FIG. 2 of the drawings it may be seen that the air pump 47 is communicated with the housing 13 for circulating air therethrough, the forced air circulation means 45 (FIG. 9) and the vaporescence means 21 (FIG. 9) being selectively and alternately operable in a manner to be fully disclosed.

The cooking apparatus 11 also includes means, e.g., first and second baffle plate means 49, 51 to be fully disclosed, for directing the circulating air in proximity to the reservoir 15 of hot cooking oil C whereby the circulating air is first warmed by the hot cooking oil C.

The first baffle plate means 49 as clearly shown in FIG. 2 of the drawings is intended to provide a means for establishing at least in respective parts: (1) a reservoir compartment, as at 53, for receiving the reservoir 15; and (2) a cooking compartment, as at 55, for housing the rack means 17, i.e., into which the items of food may be placed during the cooking process.

The second baffle plate means 51 is intended to provide a means for establishing in part a warm air chamber, as at 57, which is interposed between the cooking compartment 55 and the reservoir compartment 53 as clearly shown in FIG. 2 of the drawings. It will be noted that the warm air chamber 57 is separated from the reservoir compartment 53 by the first baffle plate means 49.

The first baffle plate means 49 includes means which is constructed of aluminum or the like which naturally readily conducts heat and/or which is provided with a plurality of passageways as at 59, for enhancing conductible heat transfer between the reservoir compartment 53 and the warm air chamber 57 whereby the warm air chamber 57 is heated by the heated cooking oil C, i.e., the heat passing through the passageways 59 as represented by an arrow 61.

The cooking appartus 11 also includes a door 63 attached to the housing 13 by a pair of hinges 65 and which opens into the cooking compartment 55. The door 63 preferably includes a glass panel 67 to enable the potato chips PC or doughnuts D to be viewed during the cooking process.

From FIG. 1 of the drawings it may be seen that one side of the reservoir compartment 53 is provided with an access door or panel 69 which may be removed to gain access to the reservoir compartment 53. If desirable, the access door panel 69 may be formed integrally with the reservoir 15 in a manner well known to those skilled in the art. Additionally, one side of the warm air chamber 57 is provided with an access door or panel 71 which provides access to the fluid pump 25 and the air pump 47 contained within the warm air chamber 57.

The front of the warm air chamber 57 and the reservoir compartment 53 are covered by a fixed panel 73 which has a thermostatically controlled lamp 75 attached thereto which is automatically illuminated subsequent to the cooking oil C reaching a predetermined temperature.

The cooking apparatus 11 also includes timer means 77 having at least one control 77a which is conveniently fitted to the front panel 73 as clearly shown in FIG. 1 of the drawings.

The operating structure, i.e., to be fully defined as the specification proceeds, is preferably controlled by a master switch 79 which is also conveniently fitted to the front panel 73. A typical thermostat 81 is included for preselecting any one of an infinite range of heat settings for the cooking oil C. e.g., 150° to 500° F. or the like.

The timer means 77 provides for establishing sequential operating parameters for the vaporescene means 21 and the forced air circulation means 45 in a manner to be disclosed.

From FIGS. 4 and 6 of the drawings it may be seen that an alternate embodiment of the wire mesh-like trays 33 is disclosed herewith and is characterized therein by the numeral 33', i.e., including an upper tray 33a' and a lower tray 33b'. Both embodiments of the upper trays 33a, 33a' are substantially flat in cross-section as illustrated in FIGS. 5 and 6 while the lower trays 33b, 33b' include numerous prominences or protuberations, as at 83, 83' respectively for nesting the food items. It will be appreciated that since the potato chips PC are much smaller in both diameter and thickness, the protuberances 83 (FIG. 5) are preferably considerably smaller than are the protuberances 83' as shown in FIG. 6 of the drawings.

Figure 8:
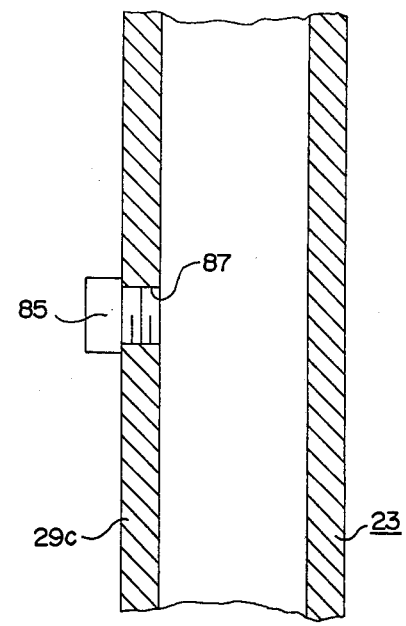
FIG. 8 is a view similar to FIG. 7 depicting the option of removing certain nozzles for particular items of food.

Since the doughnuts D are considerably thicker than are the potato chips PC, the concept herein disclosed includes rearranging the structure contained within the cooking compartment 55 when changing from potato chips PC to doughnuts D. In other words, FIGS. 1 and 2 show the cooking compartment 55 in a preferred arrangement for cooking potato chips. Converting the cooking apparatus 11 to facilitate cooking doughnuts involves more than simply changing the trays 33 with the trays 33'. More specifically, when making this change, it is recommended that alternate levels of the horizontal conduit members be removed and replaced with plug-like structure as at 85 in FIG. 8 of the drawings. The horizontal conduit members 31 are threadedly received in threaded transverse apertures, as at 87, suitably provided in the vertical conduit members 29. When the horizontal conduit members 31b and 31d are removed from their respective apetures 87 a like number of plugs 85 are suitably fitted into the empty apertures 87, i.e., in the manner as indicated in FIG. 8 of the drawings. Additionally, the wire mesh-like trays 33' would be supported on the tray support ledges 35b and 35e, thus each layer of the doughnuts D contained on the trays 33' would be exposed to upwardly and downwardly directed nozzles 27.

The second baffle plate means 51 preferably is sloped downwardly toward a drain tube 89 for collecting the condensed cooking oil C and returning it to the reservoir 15, i.e., the cooking oil C changes from the vaporous state to the liquid state as the cooking compartment 55 becomes oversaturated with the vaporous cooking oil. Therefore, the cooking oil C makes a complete cycle since the conduit means 23 includes a flexible pickup tube 91 which extends downwardly into the cooking oil C as clearly shown in FIG. 2 of the drawings. More specifically, the pump means 25 pulls the oil C upwardly through the tube 91 and forces it outwardly through a four-way solenoid actuated valve 93, thence through the plurality of vertical conduit members 29, thence through the plurality of vertical conduit members 29, thence through the horizontal conduit members 31, thence outwardly through the numerous nozzles 27, thence downwardly through the drain tube 89, i.e., subsequently to being condensed and collected upon the second baffle plate means 51. A filter 94 is preferably provided between drain tube 89 and the reservoir 15.

The front panel 73 is provided with an orifice 95 and an exhaust port 97 is suitably provided in a top panel 99 of the housing 113. Therefore, the air being circulated by the forced air circulation means 45 enters the warm air chamber 57 through the orifice 95; thence through the air pump 47; thence through the four way vlave 93; thence through the vertical and horizontal conduit members 29, 31; thence purging the cooking compartment 55 as it is blown outwardly through the nozzles 27; thence exiting the cooking compartment 55 through the exhaust port 97.

Particular attention is now directed toward FIG. 9 of the drawings wherein it may be seen that the cooking appartus 11 includes typical male electrical plug 101 which is intended to be inserted into any convvenient 115 volt A.C. wall outlet or the like. The vaporescence means 21 includes an electric motor 103 for driving the pump means 25. Additionally, the forced air circulation means 45 includes an electric motor 105 for driving the air pump 47. If desired, a single motor may be used in palce of the two motors 103, 105 for driving pump means 25 and air pump 47. The timer 77 is connected to the power plug 101 by a pair of conductors 107, 109, i.e., the master switch 79 being interposed between the power plug 101 and the timer 77 as clearly shown. Therefore, closing the switch 79 completes the circuit to the heating element 19, i.e., through a pair of closed contacts 117, 119 of the thermostat 81. More specifically, current passes through a conductor 111 which has one end thereof connected to the timer 77 and the other end thereof connected to a terminal 113; thence through a conductor 115 having one end thereof connected to the terminal 113 and the other end thereof terminating at one of the closed contacts 117, 119; thence to the heating element 19.

The lamp 75 incoporates a thermostat 121 which closes after the cooking oil C reaches a predetermined termperature thus illuminating the lamp 75, i.e., the contact 113 thereof being energized through the conductor 111 and the lamp 75 being energized through a conductor 123.

The timer 77 may be of any conventional construction for establishing sequential operating parameters for the vaporescence means 31 and the forced air circulation means 45. However, in cooking either potato chips PC or doughnuts D a preferred sequence would be to suitably program the timer 77 so that the forced air circulation means 45 is operated for a period of time to dry the potato chips prior to the cooking process and to raise the doughnuts, i.e., the period of time for raising the doughnuts would obviously be greater than the period of time for drying the potato chips. The next cycle for the timer 77 would be shut off the forced air circulation means 45 and cause the vaporescence means 21 to be operated, i.e., the timer 77 preferably would incorporate well known structure for selecting various parameters for the operation of either the forced air circulation means 45 or the vaporscence means 21.

The four-way valve 93, is normally in the position shown in FIG. 9, i.e., being operated only when the forced air circulation means is operated. Accordingly, the valve 93 preferably includes a solenoid 125 which is operated simultaneously with the forced air circulation means 45. More specifically, the closing of certain contacts (not shown) within the timer 77 causes current to travel though a conductor 127 which is tied to a pair of conductors 129, 131 at a junction point 133, i.e., one end of the conductor 129 is connected to the junction 133 while the other end thereof is connected to the solenoid 125 and one end of the conductor 131 is connected to the junction 133 while the other end thereof is connected to the motor 105. Thus, the valve 93 moves to the right as shown in FIG. 9 (when the solenoid 125 is energized) causing the warm air to be force through a conduit 135, thence upwardly through the left side of the valve 93, thence into the conduit means 23 previously described.

On the other hand, the timer 77 also includes certain contacts (not shown) which are closed to alternately cause current to flow through a conductor 137, i.e., one end of the conductor 137 terminates at the timer 77 while the other end thereof terminates at the motor 103. Thus, the pump 25 is caused to be operated which pulls the hot cooking oil C through the flexible tube 91, thence forced outwardly through the pump 25 through a conduit 139, thence through the right side of the four-way valve 93, thence through the conduit means 23, i.e., the solenoid 125 and the motor 105 being de-energized during the time the motor 103 is being operated.

The timer 77 preferably includes programming structure (not shown) to cause the vaporescence means 21 to be de-energized after preselectable periods of time and to again cause the forced air circulaton means 45 to be operated for a controllable period of time following the cooking process to circulate warm air through the cooking compartment 55 purging the compartment 55 from the oil vapors and drying the potato chips PC or the doughnuts D. Thus, the potato chips PC or the doughnuts D are crisp and non-oily and most wholesome immediately as they are taken from the cooking compartment 55.

Although the invention has been described and illustrated with respect to a preferred embodiment thereof, it is to be understood that it is not to be so limited since changes and modifications may be made therein which are within the full intended scope of the invention.

I claim:

1. An apparatus for cooking various food items, said apparatus comprising a housing, a reservoir for containing a quantity of cooking oil, rack means for suspending the items of food within said housing at a spaced distance one from the other, means for heating the cooking oil, vaporescence means communicated with said reservoir for forming a mist of the hot cooking oil within said housing with the suspended items of food being suffused by the mist of hot oil whereby the cooking process of the food is accomplished, forced air circulation means communicated with said housing for circulating air therethrough, said forced air circulation means and said vaporescence means being selectively and alternatively operable, and means for directing the circulating air in proximity to said reservoir of hot oil whereby the circulating air is first warmed by the hot oil.

2. The apparatus as set forth in claim 1 in which is included timer means for establishing sequential operating parameters for said vaporescence means and said forced air circulation means.

3. An apparatus for cooking various food items, said apparatus comprising a housing, a reservoir for containing a quantity of cooking oil, rack means for suspending the items of food within said housing at a spaced distance one from the other, means for heating the cooking oil, vaporescence means communicated with said reservoir for forming a mist of the hot cooking oil within said housing with the suspended items of food being suffused by the mist of hot oil whereby the cooking process of the food is accomplished, first baffleplate means for establishing at least in respective parts a reservoir compartment for receiving said reservoir and a cooking compartment for housing said rack means, and second baffle-plate means for establishing in part a warm air chamber which is interposed between said cooking compartment and said reservoir compartment, said warm air chamber being separated from said reservoir compartment by said first baffle-plate means.

4. The apparatus as set forth in claim 3 in which said first baffle-plate means includes means for enhancing conductible heat transfer between said reservoir compartment and said warm air chamber whereby said warm air chamber is heated by the heated cooking oil.

5. The apparatus as set forth in claim 4 in which is included forced air circulation means for selectably and controllably moving the heated air from said warm air chamber into said cooking chamber.

6. The apparatus as set forth in claim 5 in which is included timer means for establishing sequential operating parameters for said vaporescence means and said forced air circulation means.

7. An apparatus for cooking various food items, said apparatus comprising a housing; a reservoir for containing a quantity of cooling oil; rack means for suspending the items of food within said housing at a spaced distance one from the other, means for heating the cooking oil; vaporescence means communicated with said reservoir for forming a mist of the hot cooking oil within said housing with the suspended items of food being suffused by the mist of hot oil whereby the cooking process of the food is acccomplished, said vaporescence means including conduit means for communicating said reservoir with said housing, pump means coupled to said conduit means for delivering under pressure the hot cooking oil into said housing, and a plurality of spray nozzle means disposed within said housing and being coupled to said conduit means for vaporizing the hot cooking oil thus continuously forming a mist therefrom which saturates the interior of said housing as said pump means is being operated; forced air circulation means communicated with said housing for circulating air therethrough; and timer means for establishing sequential operating parameters for said vaporescence means and said forced air circulation means with said forced air circulation means and said vaporescence means being selectively and alternatively operable.

8. An apparatus for cooking potato chips and doughnuts, said apparatus comprising a housing, a reservoir for containing a quantity of cooking oil, rack means for suspending the potato chips and doughnuts within said housing at a spaced distance one from the other, means for heating the cooking oil, vaporescence means communicated with said reservoir for forming a mist of the hot cooking oil within said housing with the suspended potato chips and doughnuts being suffused by the mist of the hot oil whereby the cooking process of the food is accomplished, means for establishing a chamber within said housing between said reservoir and said rack means, said chamber containing air, the air contained within said chamber being heated by said hot cooking oil within said reservoir, and means for selectively allowing heated air from said chamber to circulate about said rack means.

* * * * *